US010887435B2

(12) United States Patent
Parienti

(10) Patent No.: US 10,887,435 B2
(45) Date of Patent: Jan. 5, 2021

(54) PERSONAL DIGITAL ASSISTANT COMPRISING A SMART PHONE, A KEYBOARD AND A TABLET, ALL FITTED TOGETHER, WHICH CAN CAPTURE IMAGES

(71) Applicant: Raoul Parienti, Nice (FR)

(72) Inventor: Raoul Parienti, Nice (FR)

(*) Notice: Subject to any disclaimer, the term of this patent is extended or adjusted under 35 U.S.C. 154(b) by 0 days.

(21) Appl. No.: 16/069,231

(22) PCT Filed: Jan. 26, 2017

(86) PCT No.: PCT/FR2017/050183
§ 371 (c)(1),
(2) Date: Jul. 11, 2018

(87) PCT Pub. No.: WO2017/129911
PCT Pub. Date: Aug. 3, 2017

(65) Prior Publication Data
US 2019/0028578 A1    Jan. 24, 2019

(30) Foreign Application Priority Data

Jan. 26, 2016    (FR) .................................... 16 00127

(51) Int. Cl.
*H04M 1/00*    (2006.01)
*H04M 1/02*    (2006.01)
(Continued)

(52) U.S. Cl.
CPC ........ *H04M 1/0214* (2013.01); *G06F 1/1616* (2013.01); *G06F 1/1624* (2013.01);
(Continued)

(58) Field of Classification Search
CPC .... H04M 1/0214; H04M 1/0264; H04M 1/04; H04M 1/72527; H04N 13/239;
(Continued)

(56) References Cited

U.S. PATENT DOCUMENTS 5,799,068 A * 8/1998 Kikinis ................. G06F 1/1616
379/357.01
6,697,032 B2 * 2/2004 Chitturi ................. G06F 1/1601
345/158

(Continued)

OTHER PUBLICATIONS

GraalPhone homepage, retrieved from https://www.graalphone.com/en/home/ (Year: 2016).*

(Continued)

*Primary Examiner* — Mahendra R Patel
(74) *Attorney, Agent, or Firm* — James C. Lydon

(57) ABSTRACT

A personal digital assistant, including: a mobile telephone equipped with a first screen and a first central processing unit managing a first memory; a casing including at least a second screen and a second central processing unit managing a second memory, the casing including a recess for receiving and removably retaining at least part of the mobile telephone; and communication devices for communication between the central processing units of the casing and the mobile telephone. At least one of the central processing units is configured to store data in each of the first and second memories.

17 Claims, 9 Drawing Sheets

(51) Int. Cl.
*G06F 1/16* (2006.01)
*H04M 1/04* (2006.01)
*H04M 1/725* (2006.01)
*H04N 5/225* (2006.01)
*H04N 13/239* (2018.01)

(52) U.S. Cl.
CPC ........ *G06F 1/1632* (2013.01); *H04M 1/0264* (2013.01); *H04M 1/04* (2013.01); *H04M 1/72527* (2013.01); *H04N 5/2252* (2013.01); *H04N 13/239* (2018.05); *H04M 2250/16* (2013.01); *H04M 2250/52* (2013.01)

(58) Field of Classification Search
CPC .............. H04N 5/2252; H04N 1/72527; G06F 1/1616; G06F 1/1624; G06F 1/1632; G06F 1/1626; G06F 1/1656; G06F 1/72527
USPC .................................... 455/556, 556.1, 556.2
See application file for complete search history.

(56) References Cited

U.S. PATENT DOCUMENTS

| | | | | |
|---|---|---|---|---|
| 7,054,965 B2 * | 5/2006 | Bell | ...................... | G06F 1/1626 345/1.1 |
| 7,254,015 B2 * | 8/2007 | Yin | ...................... | G06F 1/1616 361/679.55 |
| 7,706,850 B2 * | 4/2010 | Parivash | ........... | H04M 1/72527 455/575.4 |
| 7,830,333 B2 * | 11/2010 | Aoki | ..................... | G06F 1/1616 345/1.3 |
| 8,630,088 B2 * | 1/2014 | Collopy | ................ | G06F 1/1684 361/679.55 |
| 2004/0019724 A1 * | 1/2004 | Singleton, Jr. | ........ | G06F 1/1632 710/303 |
| 2004/0114315 A1 * | 6/2004 | Anlauff | ................. | G06F 1/1681 361/679.28 |
| 2004/0228077 A1 * | 11/2004 | Hall | ...................... | G06F 1/1601 361/679.25 |
| 2007/0182663 A1 * | 8/2007 | Biech | .................... | G06F 1/1654 345/1.1 |
| 2008/0024614 A1 * | 1/2008 | Li | .......................... | H04N 5/225 348/207.99 |
| 2008/0043414 A1 * | 2/2008 | Ghosh | .................. | G06F 1/1679 361/679.27 |
| 2008/0304688 A1 * | 12/2008 | Kumar | ................ | H04M 1/0258 381/370 |
| 2009/0209287 A1 * | 8/2009 | Ravelo | .................. | G06F 1/1632 455/556.1 |
| 2010/0194860 A1 * | 8/2010 | Mentz | .................. | H04N 5/2252 348/47 |
| 2012/0194053 A1 * | 8/2012 | Hsu | ........................ | E05D 11/06 312/319.1 |
| 2012/0282978 A1 * | 11/2012 | Carmody | .............. | G06F 1/1632 455/557 |
| 2013/0080670 A1 * | 3/2013 | Medica | ................. | G06F 1/1669 710/110 |
| 2014/0254082 A1 * | 9/2014 | Lin | ....................... | G06F 1/1616 361/679.27 |
| 2015/0033225 A1 * | 1/2015 | Rothman | ............ | G06F 9/45533 718/1 |

OTHER PUBLICATIONS

"GraalPhone concept is a modular smartphone, laptop, tablet, and 3D camera," Brad Linder, Liliputing, Jan. 5, 2017, retrieved from https://liliputing.com/2017/01/graalphone-concept-modular-smartphone-laptop-tablet-3d-camera.html (Year: 2017).*

"Graalphone is a 4-in-1 device which combines Windows 10 and Android," Mayank Parmar, Windwos Latest, Jan. 7, 2017 retrieved from https://www.windowslatest.com/2017/01/07/graalphone-is-a-4-in-1-device-which-combines-windows-10-and-android/ (Year: 2017).*

Search report in PCT/FR2017/050183.
Written Opinion in PCT/FR2017/050183.

* cited by examiner

PERSONAL DIGITAL ASSISTANT COMPRISING A SMART PHONE, A KEYBOARD AND A TABLET, ALL FITTED TOGETHER, WHICH CAN CAPTURE IMAGES

TECHNICAL FIELD OF THE INVENTION

The present invention relates to a personal digital assistant comprising a smartphone, a keyboard and a tablet all fitted together, capable of taking pictures in three dimensions.

It applies to the field of smartphones, having functions of a personal digital assistant and a camera making it possible to take still or animated images and in relief.

BACKGROUND OF THE INVENTION

Recent years have seen major developments in mobile telephones with devices of the smartphone and touch-sensitive tablet type, capable of offering functionalities approaching those of small computers and provided with cameras, and suitable for taking pictures on a day-to-day basis.

However, most of these devices offer a touch-sensitive keyboard that is not very favorable to intensive use, and the tablets that may be associated with a real keyboard have substantial sizes and are not appropriate for being housed in a pocket. Furthermore, most smartphones that are commercially available are provided with a camera having only a fixed lens with a small aperture, due to the small thickness of these devices, which does not make it possible to have a true multi-lens objective while offering high definition and an optical zoom. Likewise, still due to the small thickness of this type of device, almost all of them have a flash using light-emitting diodes (LEDs), the performance of which is very limited. Furthermore, the devices cited above do not make it possible to take three-dimensional pictures.

BRIEF DESCRIPTION OF THE INVENTION

The present invention aims to resolve all or some of these drawbacks.

To that end, according to a first aspect, the present invention relates to a portable personal digital assistant including:
- a mobile telephone provided with a first screen, a first central processing unit managing a first memory,
- a casing including at least one second screen, a second central processing unit managing a second memory,
- the casing including a recess configured to receive and retain, removably, at least part of the mobile telephone inside it,
- communication means between the central processing units of the casing and the mobile telephone,
- at least one of the central processing units being configured to store data in each of the first and second memories.

Owing to these arrangements, the peripherals of at least one of the central processing units, for example image sensors, keyboard, touch-sensitive screen and communication means with communication networks, can provide data to the two memories. The sharing of data is thus made easier and the user has stored data that he needs when he separates the mobile telephone from the casing.

In embodiments, each of the central processing units is configured to store data in each of the first and second memories.

Owing to these arrangements, the two central processing units, of the casing and the mobile telephone, can share data according to the user's instructions.

In embodiments, the mobile telephone includes a first image sensor and the casing includes an opening across from the recess in the position where the image sensor is located when the mobile telephone is at least partially inserted and retained in the recess of the casing.

Owing to these arrangements, the same image sensor of the mobile telephone is also used for the mobile telephone when it is not inserted in the casing, and for the casing when the mobile telephone is inserted at least partially therein.

In embodiments, the casing includes a second image sensor positioned at a distance between five and eight centimeters from said opening.

Owing to these arrangements, the two image sensors can take three-dimensional images, with a separation of the points of view substantially equal to the separation between the pupils of the eyes of an adult user. At least one of the central processing units being configured to store data in each of the first and second memories, one of the memories can receive images coming from both image sensors and therefore keep stereoscopic images.

In embodiments, the second screen is of the auto-stereoscopic type.

Owing to these arrangements, the stereoscopic images captured by the two image sensors can be viewed on the screen of the casing.

In embodiments, the casing includes, in its housing, at least one connector configured to connect to a connector of the mobile telephone when the mobile telephone is at least partially inserted into said recess.

Owing to these arrangements, the communication means between the central processing units include said connectors. The energy consumption is thus reduced. Furthermore, the casing can power and recharge the battery of the mobile telephone.

In embodiments, the casing includes a keyboard, the second screen being mounted sliding on said keyboard when it is turned toward the outside of the casing and rotated when it does not cover said keyboard or covers it while being turned toward the inside of the casing.

Owing to these arrangements, the user has a portable computer with a screen that can be tilted, when the screen does not cover the keyboard, and a tablet when the screen covers the keyboard and is turned toward the outside of the casing.

In embodiments, the second screen includes, on two opposite sides, two side studs, a support of the second screen in the casing including, on two opposite sides, two rails for guiding the translation of the studs of the second screen, the support also including two side studs on said sides, and the second screen being surrounded, on said sides, by guide rails for the side studs of the support.

Owing to these arrangements, the screen slides on the support, which includes the keyboard and can either hide this keyboard, or make it accessible to the user.

In embodiments, each rail of the support has, at one of its ends, a circular opening with a set of electrical contacts in an arc of circle corresponding to electrical contacts located on an edge of the second screen, the electrical contacts of the second screen sliding on the electrical contacts of the support during the incline of the screen.

Owing to these arrangements, the second screen receives, in different incline positions, the signals of images to be displayed and the power from its light source.

In embodiments, each rail of the support has, at the other of its ends, electrical contacts on which the electrical contacts of the second screen bear when the second screen covers the keyboard while being turned toward the outside of the casing.

In embodiments, the casing includes a third screen stored in a slot inside the second screen, the third screen leaving the second screen when it is pulled, then being positioned edge to edge with the second screen.

Owing to these arrangements, the surface area of the second screen is doubled with the third screen.

In embodiments, optocouplers are respectively secured to the second screen and a support of the second screen, said optocouplers being located opposite, during a rotational movement of the screen with respect to a screen support.

Owing to these arrangements, the communication between the screen and its support is made more reliable and very quick.

In embodiments, the casing includes a key for making a call when the mobile telephone is housed in the recess and receives a telephone call. Owing to these arrangements, the user can take an incoming call without having to take the mobile telephone out of the recess of the casing.

In embodiments, at least one of the central processing units is configured to command the joint operation of the casing and the mobile telephone so that, in a photo device or camera operating mode with three-dimensional images:
 both image sensors have the same field of vision, optionally through a digital zoom, and are synchronized.
 the stereoscopic image, done through a combination of two captured images, is kept in memory, in at least one of the first and second memories.

Owing to these arrangements, the image acquisitions are done automatically and synchronized in dimensions and over time, even if one of the sensors has a variable-focus objective (zoom).

In embodiments, at least one of the central processing units is configured to command the joint operation of the casing and the mobile telephone so that, in a tablet operating mode, the first central processing unit of the smartphone manages the second screen, the first and second memories containing the same application data, the second screen serving for the mobile telephone, as touchscreen replacing the first screen, which remains off.

Owing to these arrangements, the resources of the mobile telephone, in particular in terms of power and computing speed, are taken advantage of in the tablet operation.

In embodiments, at least one of the central processing units is configured to command the joint operation of the casing and the mobile telephone so that, in a computer operating mode, the casing performs traditional computer functions, including text processing and Internet browsing.

The user thus has the typical functions of a computer.

In embodiments that implement the tablet and computer operating modes, the computer operating mode not implementing the same operating system as the tablet operating mode, the switching between the operating systems done being done automatically during a change of position of the screen of the casing. Owing to these arrangements, the user does not have to switch between these operating systems himself.

In embodiments, at least one of the central processing units is configured to command the joint operation of the casing and the mobile telephone so that, in an extended mobile telephone operating mode, in which the second screen is used as a peripheral for display and capturing touch-sensitive pressing and a keyboard is used for entering text. The casing can thus have limited resources, in particular in terms of microprocessor power and speed. The personal digital assistant is thus less expensive.

BRIEF DESCRIPTION OF THE FIGURES

Other advantages, aims and features of the present invention will emerge from the following description, done in reference to the appended drawings, in which:

FIG. 19 shows, in six steps and a detail view, the reversal of the screen between the configuration illustrated in FIG. 7 and that illustrated in FIG. 8.

DETAILED DESCRIPTION OF THE INVENTION

Figure 15:
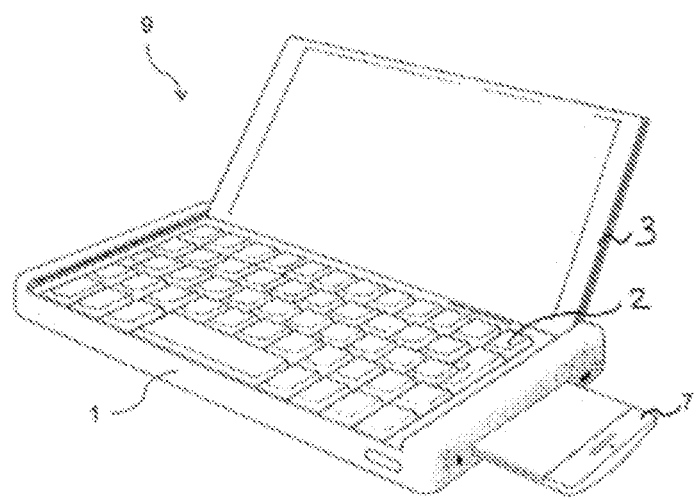
FIG. 15 shows, schematically and in perspective view, the casing receiving the smartphone in its recess.
Figure 16:
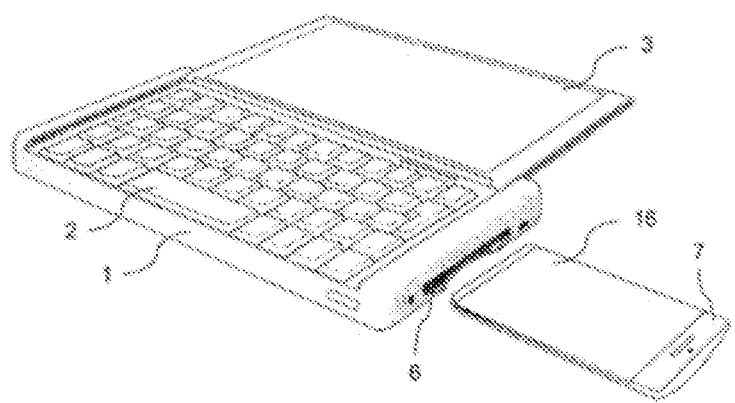
FIG. 16 shows, schematically and in perspective view, the smartphone removed from the recess of the casing.

As observed in FIGS. 15 and 16, the personal digital assistant 9 includes two main parts: a casing 1 and a mobile telephone 7, generally a smartphone. A recess 6 of the casing 1 has the outer shape of at least part of the smartphone 7 and means for retaining the smartphone 7 in position in the recess 6. The smartphone 7 includes a first screen 16. The casing 1 includes a second screen 3.

Figure 7:
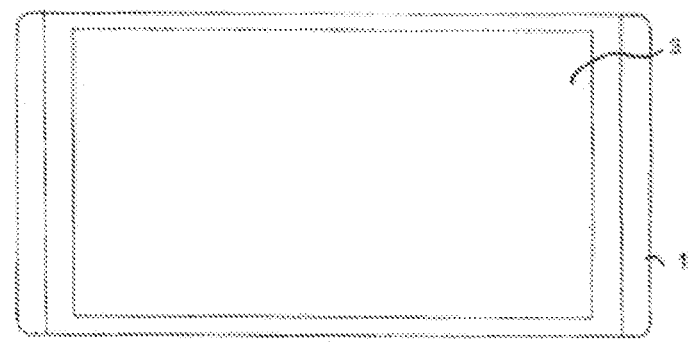
Figure 8:
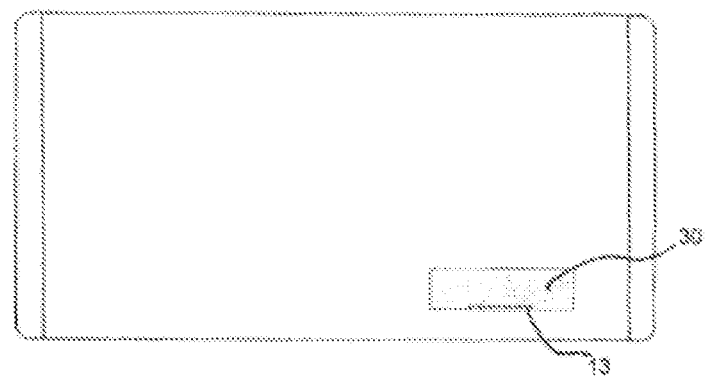

In the embodiment illustrated in FIGS. 15 and 16, the casing 1 also includes a keyboard 2. Preferably, the screen 3 is movable relative to the keyboard 2 so that the screen 3 covers the keyboard 2, either while being turned outward, as illustrated in FIG. 7, or while being turned inward, i.e., toward the keyboard 2, as illustrated in FIG. 8.

Figure 1:
FIG. 1 schematically shows a side face of a casing of one particular embodiment of the personal digital assistant according to the invention, FIG. 2 schematically shows the face opposite that illustrated in FIG. 1, FIG. 3 schematically shows a stationary front face of the casing illustrated in FIGS. 1 and 2, including a keyboard, FIG. 4 schematically shows a side face of the casing including an opening of a recess for a mobile telephone, FIG. 5 schematically shows a side face of the casing opposite the face illustrated in FIG. 4, FIG. 6 schematically shows the face of the casing opposite the face illustrated in FIG. 3, FIG. 7 schematically shows the front face illustrated in FIG. 3, covered by a movable screen relative to the keyboard, screen turned outward, FIG. 8 schematically illustrates the front face illustrated in FIG. 3, covered by a movable screen relative to the keyboard, screen turned inward, i.e., toward the keyboard, FIG. 9 schematically illustrates an alternative of the face illustrated in FIG. 6, FIG. 10 schematically illustrates the casing with an image acquisition device objective deployed, FIG. 11 schematically shows an embodiment of an articulation between the screen and the casing, FIG. 12 schematically and partially shows the rotation configuration of the screen on the casing and the contacts between them, FIG. 13 schematically, and in sectional view, shows a smartphone housed in the recess illustrated in FIG. 4.
Figure 4:
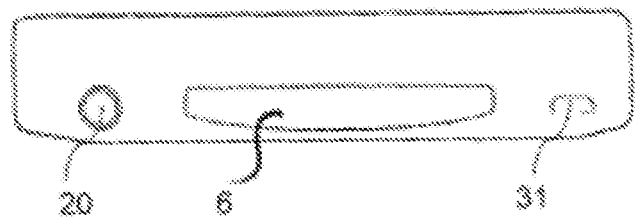
Figure 5:
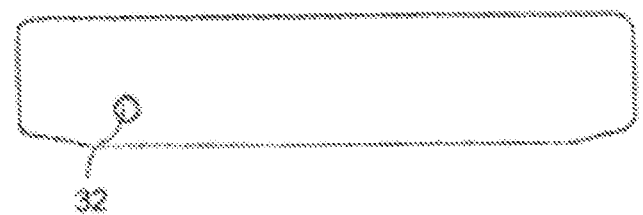
Figure 6:
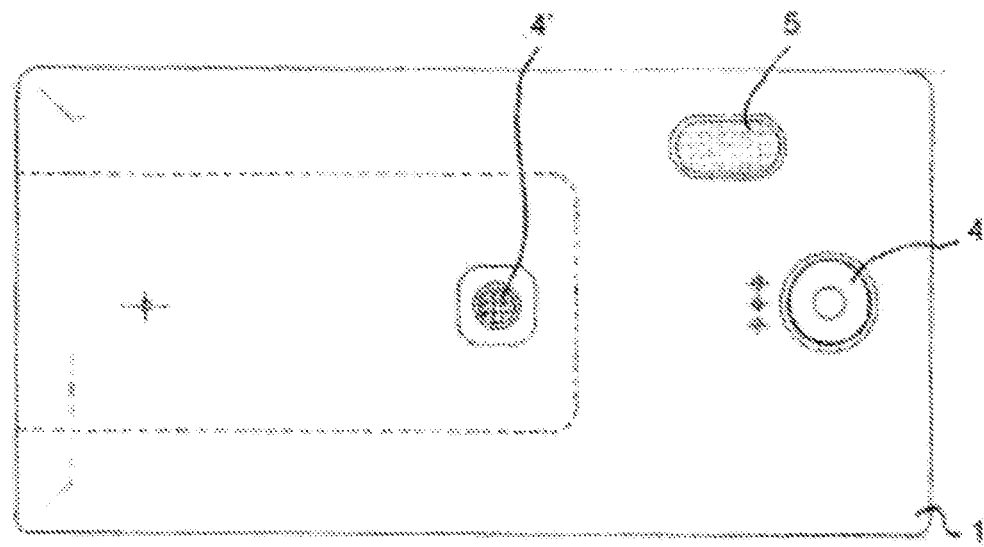

We will now describe, in reference to FIGS. 1 to 6, the six faces of the casing 1. FIG. 1 shows a man/machine interface for acquiring images done with at least one of the following image sensors: an image sensor 4 of the casing 1 and an image sensor 4' of the smartphone 7, both shown in FIGS. 6, 9 and 20. The key 21 makes it possible to trigger the image acquisition, still or animated. In photo mode, chosen by implementing the key 23, pressing on the key 21 triggers the capture of a photo, and prolonged pressing makes it possible to take bursts. In video mode, chosen by implementing the key 23, pressing on the key 21 starts the capture of a video and pressing it a second time stops it. The key 20 causes the deployment of the optical set of the image sensor 4 and activates the acquisition function. Pressing the key 20 a second time causes the withdrawal of the optical set of the image sensor 4 and stops the acquisition mode. The key 23 is a slider with four positions: 2D photo, 3D photo, 2D video, 3D video. In the case of 3D photos and videos, the key 21 simultaneously commands the capture of images by the sensor 4 and the capture of images by the sensor 4' and, in the 3D photo mode, the triggering of a flash 5 (FIG. 6).

The key 31, touched repeatedly, makes it possible to adjust the flash 5, either in automatic mode, or in forced mode (the flash is always fired), or in flashless mode. The selected mode appears via a logo on the screen 3. By default, when turned on, the flash is set to automatic mode. Other, more sophisticated parameters of the acquisition device are implemented via the touchscreen 3 and are comparable to what is done in this field, regarding devices of the smartphone type and cameras.

The key 22 is a switch in acquisition mode; it acts on the zoom objective (optical zoom) of the image sensor 4, pressing left increasing the focal length and pressing right reducing it. Initially, the optical zoom is activated, then when it reaches the limit threshold (for example, 5×), a digital zoom takes over. A cursor on the screen 3 depicts the focal length of the zoom objective. To take 3D images, a digital zoom is applied to the image captured by the sensor 4' so that the angular optical fields of the images captured by the two image sensors are equal.

In non-shooting mode, the key 22 acts on the audio volume of a speaker of the casing 1.

Figure 2:
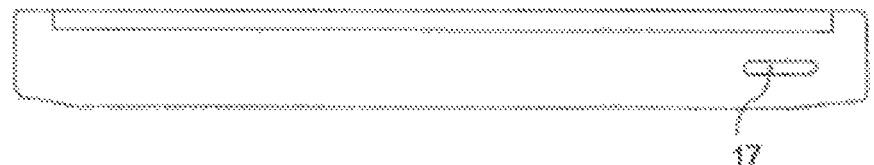

FIG. 2 shows the opposite face with, on its right, a general on/off key 17, which stops or starts the operation of the personal digital assistant 9. When the personal digital assistant 9 is on, pressing the key 17 twice launches the speaker function.

Figure 3:
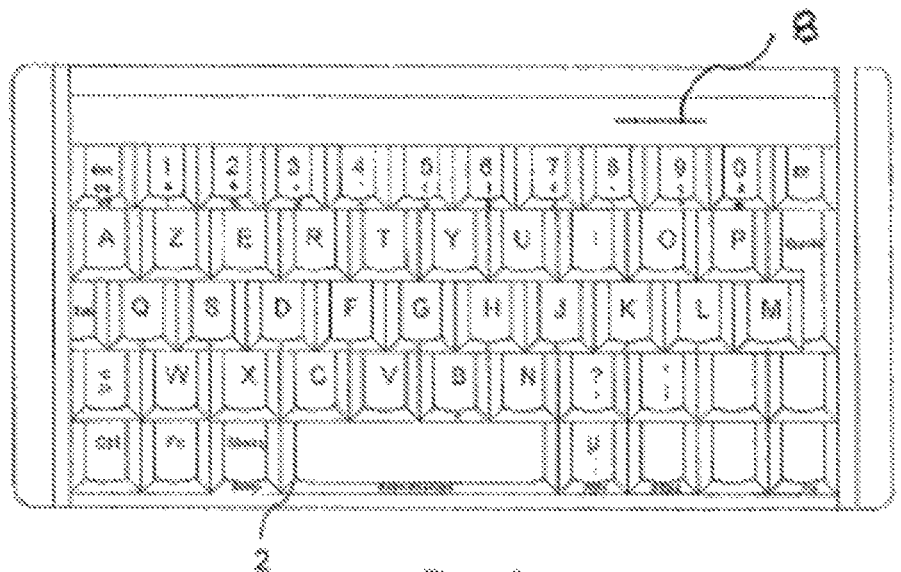

FIG. 3 shows the keyboard 2 with a set of electrical contacts 8 making it possible to power the screen, to provide it with data to be displayed and receive tactile bearing data therefrom.

FIG. 4 shows the recess 6 making it possible to receive and retain, at least partially, the smartphone 7 and a recess 20 for a stylus (not shown). One can also see, on the right, a female connector 31 making it possible to recharge the battery (not shown) of the casing 1 and, if it is retained in the recess 6, the battery of the smartphone 7.

FIG. 5 shows a connection jack 32 for earphones and, optionally, a microphone. FIG. 6 shows the image sensors 4 and 4' and the flash 5. In order for the image sensor 4' of the smartphone 7 to take pictures while the smartphone is housed in the recess 6, a through opening traverses the wall of the face illustrated in FIG. 6. Preferably, the distance between the image sensors 4 and 4' corresponds to the distance between the pupils of the eyes of an adult, or between five and eight centimeters, and preferably between six and seven centimeters. Thus, the 3D or stereoscopic images represent the normal view of an adult.

FIG. 7 shows the screen 3 covering the keyboard 2 and facing outward. In this configuration, the personal digital assistant 9 is used as a tablet.

FIG. 8 shows the screen 3 covering the keyboard 2 and facing inward, i.e., toward the keyboard 2. In this configuration, the screen 3 is protected and the personal digital assistant 9 can be placed in a pocket.

A display screen 30 makes it possible, in case of incoming call while the smartphone 7 is in the recess 6, to see the number of the caller, and optionally the latter's name. One can also see, in FIG. 8, a set of electrical contacts 13 for powering the screen 3. Once the screen 3 has returned to the tablet function (FIG. 7), the sets of electrical contacts 8 (FIG. 3) and 13 come into electrical contact and allow the electronics of the casing 1 to power the screen 3, to provide it with data to be displayed and to receive tactile input data in return.

In call reception mode (the smartphone 7 is inside the recess 6), the number or name of the caller appears on the screen 30. A short press on a key in this situation causes the placement in communication, the user grasping the casing, which he brings to his ear. A long press in the same situation (reception mode) causes the call to be rejected.

In the situation seen previously, during an incoming call and hanging up of the telephone, at any time, the user can press on the visible edge of the smartphone 7, which causes it to be removed (Push-Pull device). The user can continue the conversation with his smartphone 7 without it cutting off, the casing 1 simultaneously becoming available for another use.

Figure 9:
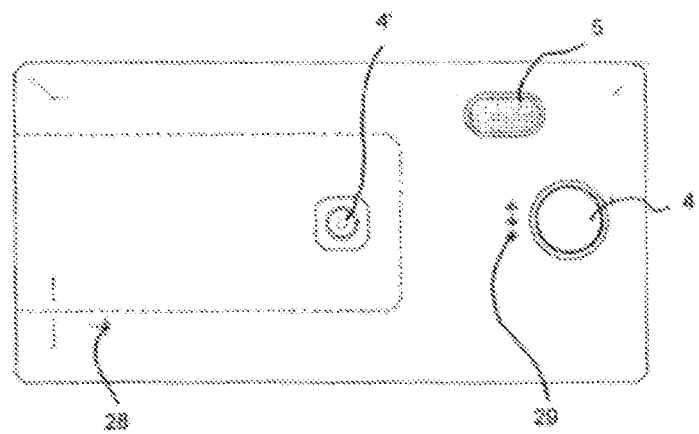

FIG. 9 shows the rear face of the casing, an objective 4 of the casing, an objective 4' of the smartphone 7, a flash 5, a speaker 29 and a microphone 28.

Figure 10:
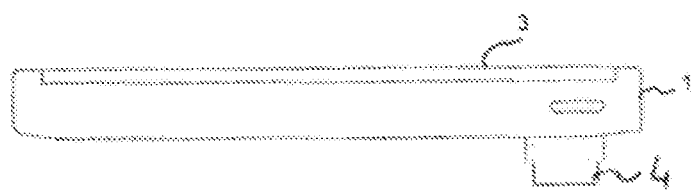

FIG. 10 shows the casing with the objective of the image sensor 4 deployed.

Figure 11:

FIG. 11 shows the articulation between the screen 3 and the screen support of the casing 1, with the studs secured to the support and the studs secured to the screen 3 guided by the rails, respectively of the screen 3 and the support.

The opening system of the screen 3 is based on the principle of two juxtaposed rails 25 and 27. Each of the rails 25 and 27 is provided, at one of its ends, with a stud 26 and 24, respectively. The stud of one is guided by the rail of the other. These rails and studs are placed on each small side of the screen 3, symmetrically. Two rails 27 are therefore fixed on each side of the screen 3 and two other rails 25 on each side of the screen support secured to the keyboard 2.

Once the screen 3 is assembled to the screen support, the two studs 24 of the two rails 27 secured to the screen 3 are engaged in the two rails 25 of the screen support, and the two studs 26 of the two rails 25 secured to the screen support are engaged in the two rails 27 of the screen 3. Once it is opened, the screen 3 is guided all throughout its travel, from the closed casing position, top of FIG. 19, to the tablet position, at the bottom of FIG. 19. The intermediate positions are successively shown, from top to bottom, in FIG. 19.

Figure 12:
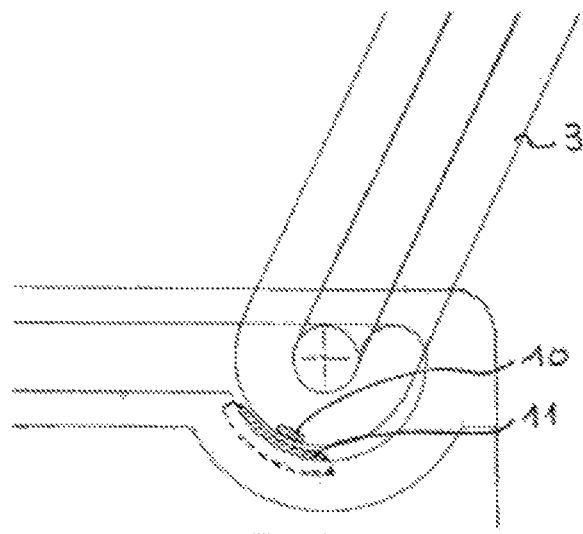

FIG. 12 shows the rotation of the screen 3 on the screen support and the opposite electric contacts making it possible to power the screen and exchange data with it. In the open casing position, the screen 3 can assume several rotational positions as the user wishes. To that end, a set of electrical contacts 10 located on the base of the screen 3 is in electrical contact with another set of electrical contacts 11 forming an arc of circle allowing the supply of power to the screen 3 according to several rotation angles, FIG. 11. The electronics of the casing in parallel supply the electrical contacts 11 and 8. The sets of electrical contacts 10 and 13 are connected by a bundle of conductors (not shown). When the screen 3 is closed or exceeds a certain opening angle, the electrical contacts 10 and the connectors 11 separate, and the screen 3 turns off. Thus, the casing 1 and the screen 3 remain in electrical contact owing to the set of electrical contacts 10 located on the base of the screen 3 sliding in rotation on the set of electrical contacts 11 forming an arc of circle, so that the screen 3 is connected continuously over a large range of angles.

Figure 13:
Figure 14:
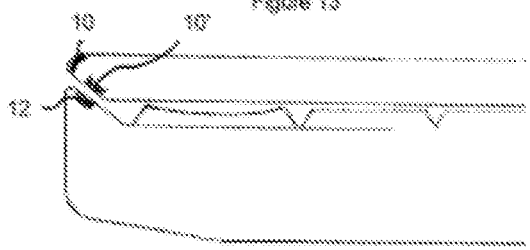
FIG. 14 shows, schematically and in sectional view, a set of electrical contacts on the border of the keyboard.

Another set of electrical contacts 12 (FIG. 14) located on the border of the casing 1 can be substituted for the set of electrical contacts 8 or used in parallel with the latter, allowing a connection with the set of electrical contacts 10' of the screen 3 and connected in parallel with the set of electrical contacts 10 located on the base of the screen 3 when the casing is positioned in tablet mode. FIG. 13 shows the smartphone 7 housed in the recess 6 and the flexible electrical contacts 19 connected to the smartphone 7 by the rigid electrical contacts 18. FIG. 14 shows the set of electrical contacts 12 on the border of the support in electrical contact with the rigid contact 10' in parallel connection with the electrical contact 10.

The personal digital assistant 9 thus assumes the form of a casing 1, FIG. 7, having a real mechanical keyboard 2, FIG. 3, the ergonomics of which are comparable to those of a keyboard of a small computer, and a screen 3, FIG. 6, with a comfortable size for extended use. However, once closed, the casing 1 has a size suitable for being housed in the pocket of a jacket, or even a shirt. The casing has communication means like current smartphones, as well as all of the attributes of smart telephones, internal memory, external memory, proximity connections, according to the communication means and communication protocols such as "Bluetooth" (registered trademark); Wi-Fi (registered trademark); NFC (acronym for Near Field Communication, registered trademark), etc., and incorporating a veritable traditional or 3D camera.

The smartphone 7 has sophisticated electronics with a latest-generation multicore microprocessor, and is capable of receiving at least one SIM (subscriber identity module) card. The casing 1 draws its power and performance by exploiting the computing power integrated into the electronics of the smartphone 7, through a set of electrical contacts and/or an optical link. However, the electronics of the casing 1 are designed for everyday uses autonomously, such as Internet connections via a Wi-Fi network, personal assistant, or playing video or listening to music.

The casing 1 and the smartphone 7 each have their own battery. When the smartphone 7 is housed in the recess 6, the power sources are connected, making it possible on the one hand to charge the casing 1 and the smartphone 7 through a single power source, and on the other hand to balance the charges of the two batteries if necessary owing to appropriate software. As an example, if the battery of the smartphone 7 becomes low, inserting it into the recess 6 allows a partial recharge, and vice versa, the battery of the casing 1 can be recharged by the battery of the smartphone 7.

The casing 1 is also provided with means making it possible to take still or animated pictures, such as a quality objective 4 designed to leave the casing 1 when it is implemented, FIG. 8, and having an optical zoom, as well as a true flash 5 of the xenon type, for example. It is also possible to use a telescoping objective inside the casing, the image of which is sent outside by a 45° mirror.

Furthermore, the casing 1 integrates a recess 6 designed to receive a smartphone 7 provided with its own camera with its objective 4' such that the distance between the optical axes of the objective of the sensor 4' and the objective 4 of the casing 1 corresponds to the average separation between the pupils of the eyes of an adult, FIG. 7.

In the described embodiments, the casing 1 is capable of assuming three positions, FIG. 19.

A closed casing position, at the top. Only the 2D-3D photo device/camera and the smartphone are functional.

An open casing position, third configuration starting from the top of FIG. 19. This position allows the use of the keyboard 2 and the screen 3 identically to a portable computer. The opening is done in the same way, by pivoting the screen 3 on its rotation axis 26 (FIG. 11), until obtaining the incline that the user has selected.

A tablet mode position, at the bottom of FIG. 19.

To go from the closed casing position, FIG. 1, to the tablet position, FIG. 6, it is necessary to open the screen 3 to 180°. The screen 3 and the casing 1 are then in the same plane, FIG. 4. Then slide the screen 3 in translation, FIG. 5, until the screen 3 is completely superimposed on the casing 1, FIG. 6.

Given the significant displacement of the screen 3, when it assumes the three positions described above, the use of a bundle of conductors to power said screen 3 is not highly recommended, since there is a risk of premature damage. Therefore, said screen 3 is powered by a set of electrical contacts 8 located on the one hand on the upper part of the keyboard, and on the other hand on the lower part of the closed casing 13. Once the screen 3 is returned to the tablet function, the sets of electrical contacts 8 and 13 come into electrical contact and allow the electronics of the casing 1 to power the screen 3, FIGS. 3 and 8.

In embodiments, the fixed or animated image acquisitions entered simultaneously by the image sensor 4 of the casing 1 and by the image sensor 4' of the smartphone 7 make it possible to generate a signal allowing a relief view, since they simulate images entered by each of the two eyes. To that end, the distance separating the two objectives corresponds to the average inter-pupil distance, or 65 mm, which makes it possible to generate photos or film in relief with appropriate processing.

3D signals, integrating both the image entered by the sensor 4 and by the sensor 4', could be exploited directly by the screen 3, owing to processing allowed by the electronics integrated into the casing 1 and ad hoc software, if said screen 3 is of the auto-stereoscopic type, namely provided on its surface with a lenticular layer designed to differentiate the image perceived by the right eye from that perceived by the left eye in order to reconstitute the relief.

If the screen 3 is not auto-stereoscopic, the 3D image, processed by the electronics of the casing, can be perceived using glasses, using techniques known at this time, for example with polarized or colored glasses (passive), synchronized (active).

The 3D signal can be recorded in the memory of the smartphone and/or the casing 1 in order to be exploited by viewing systems designed for 3D such as video projector, television.

Figure 17:
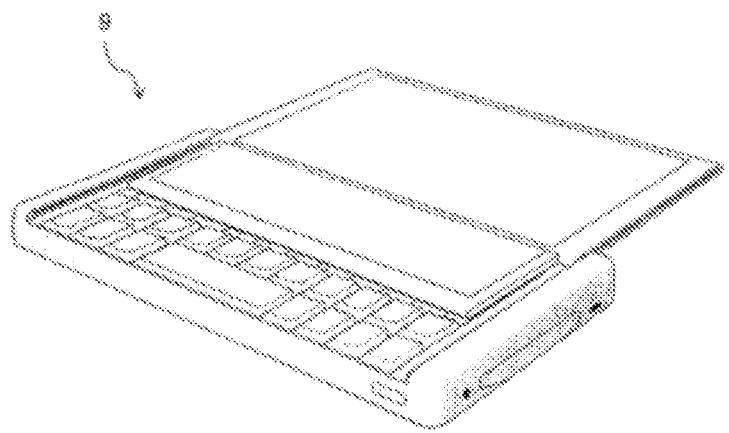
FIG. 17 shows, schematically and in perspective view, the deployment in progress of a third screen from the screen illustrated in FIG. 7.
Figure 18:
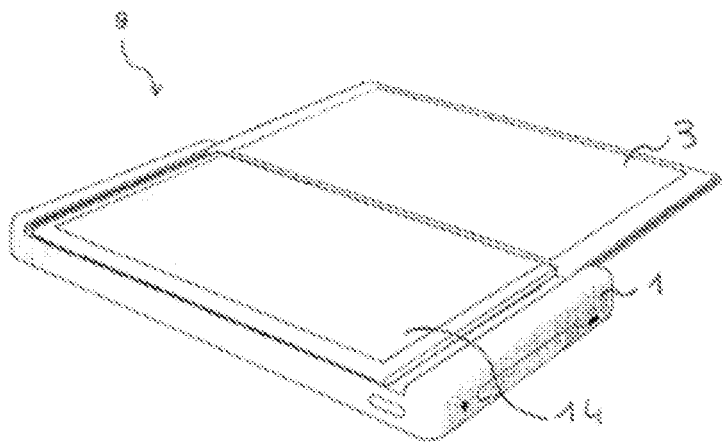
FIG. 18 shows, schematically and in perspective view, the complete deployment of the third screen illustrated in FIG. 17.
Figure 10:
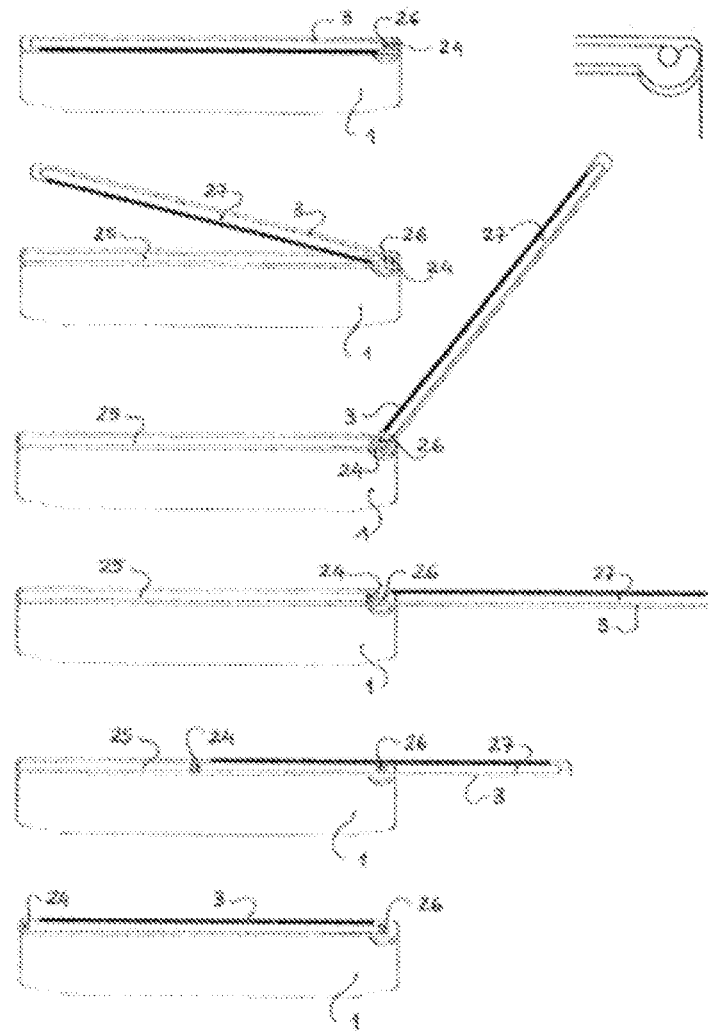

In embodiments illustrated in FIGS. 17 and 18, a third screen 14 is stored in a slot inside the screen 3 and leaves the screen 3 when it is pulled, then is positioned edge to edge with the screen 3, thus making it possible to double the surface area of the screen of the tablet. This third screen 14 has a double set of electrical contacts 15. In this configuration, the power supply of the two screens must be done by the set of electrical contacts 12 on the border of the casing, which comes into electrical contact with a set of electrical contacts 15 located at the bottom of the third screen. This third screen in turn supplies the screen 3 with another set of electrical contacts located on its upper part that comes into electrical contact with the set of electrical contacts 10.

The screen of the tablet is of the touch-sensitive type, and an appropriate stylus is designed to cooperate with said screen. Said stylus is stored in an ad hoc recess 17.

The smartphone 7 designed to be housed in the recess 6 has a set of electrical contacts 18 designed to cooperate with a set of suitable flexible electrical contacts 19, located inside the casing 1. The set of electrical contacts 18 is withdrawn and protected by a comb made from the insulating material of the casing. The set of electrical contacts is inclined relative to the horizontal plane, such that upon each maneuver to introduce and remove the smartphone 7 with respect to its recess 6, the rubbing between the firm electrical contacts 18 and the flexible electrical contacts 19 provides cleaning of said electrical contacts.

In embodiments, the electrical contacts 18 and 19 between the smartphone 7 and the casing 1 are replaced by an optical connection. The signals are then multiplexed and conveyed by a light support, then decoded to be exploited by the electronics of the casing 1 and the smartphone 7. Certain electrical contacts remain traditional, in particular those related to the recharging of the smartphone 7 by the battery of the casing 1.

In photo mode, the casing 1 is provided with a specific man-machine interface, such as an on-off key 20, a key for triggering image acquisition located to the right for ergonomic use, a key 21 switching between two positions making it possible to adjust the focal distance (zoom). A sliding key 23 makes it possible to select one of four positions: photo, film, 3D film, 3D photo.

The casing 1 may also be used as a telephone when the smartphone 7 is housed in the recess 6, in which case all of the functionalities of the telephone are offloaded from the smartphone 7 toward the casing 1, the casing 1 having a microphone 28 and a speaker 29. When an incoming call arrives, the number of the caller or the latter's name is displayed on the display screen 30 located on the back of the screen 3; it is possible to take the call by pressing on the key 21, also used to trigger image acquisition. During phone calls taken with the casing 1, at any time, the user can remove the smartphone 7 from the recess 6 and the communication can continue from the smartphone 7.

The smartphone 7 and the casing 1 are mechanically connected by a "push-pull" attachment system that allows a removal after simple pressing of the smartphone 7 toward the inside of the recess 6, a second pressing of the smartphone 7 in the same direction again making it possible to secure the casing 1 and the smartphone 7 and on the same occasion to make the connections between the electronic circuits of the two components.

All of the alternatives of the invention relative to the shapes, colors, materials, arrangements of the subassemblies and elements of the man-machine interface remain within the scope of the invention.

Preferably, above the screen 3, a webcam of traditional definition is installed. Preferably, a thread makes it possible to fasten the casing on a photo tripod for stable image acquisition. Preferably, several connectors, for example implementing the USB (Universal Serial Bus) protocol are arranged on the side faces of the personal digital assistant 9. Preferably, one of these faces also bears a micro-HDMI jack.

Regarding the recharging of the batteries and the recharging capacity of the casing 1 toward the mobile telephone 7, if the mobile telephone 7 reaches a charge level below 30%, for example, its insertion into the casing 1 allows the casing 1 to recharge the smartphone 7. In the reverse case, where the casing 1 has an insufficient charge level, for example below 10%, inserting the smartphone 7 supplies power to the electronics of the casing 1, replacing the power supply with the battery of the casing 1 itself, the charge of which is low. In this configuration, the battery of the smartphone 7 serves only for the operation of the casing 1 and not to supply power to the battery of the casing 1. In summary, the battery of the smartphone 7 is used exclusively to power the electronics of the casing 1 without recharging it.

Preferably, the smartphone 7 has a double SIM card. The two devices, the smartphone 7 and the casing 1, have a large SSD hard drive of 256 GB, programmed to be a mirror, i.e., each time the smartphone is inserted into the casing, both memories exchange their respective data, such that each of the memories contains the data for both electronic devices (smartphone and casing).

The two devices have a recess designed to receive a high-capacity SD card. Preferably, the personal digital assistant includes an FM radio tuner and/or a TNT tuner so as also to have a real small television in one's pocket. The use of a retractable antenna is preferable. Furthermore, this device makes it possible to have a headset-free radio mode.

To guarantee the communication of data between the screen 3 and its support in the casing 1, a link by optocouplers is preferably used. The data of the casing is multiplexed and sent to the screen 3, the screen 3 and the casing communicating via a two-way optical link at a very short distance; the data are multiplexed before the transfer, and demultiplexed after the transfer. Only the electrical supply contacts are used in this configuration. The two optocouplers are components of the SMC (surface-mounted component) type, one of which is located in the screen 3, the other in the screen support of the casing 1, these two components being located across from one another to exchange the data.

To produce relief photos and films, the objective of the sensor 4' of the smartphone 7 housed in the recess 6 of the casing 1 appears through an opening (see FIGS. 6 and 9). The synchronized image acquisition of these two objectives makes it possible to generate stationary or animated native 3D images.

The screen 3 of the casing is preferably auto-stereoscopic to allow the user to see his image acquisitions directly in relief, or to exploit the 3D source via a suitable television or projector.

In embodiments, the casing 1 and the smartphone 7 include communication means for communicating with one another without a wired connection.

Below, we outline the functional interactions between the casing 1 and the smartphone 7, according to operating modes including at least two of the following operating modes:

A/ In photo device or camera mode:
  In 2D image acquisition, only the image sensor of the casing is used; alternatively, only the image sensor of the mobile telephone is used,
  In 3D image acquisition, both image sensors have the same angular field of vision, optionally through a digital zoom, and are synchronized.

The flash is synchronized, in photo mode,

The stereoscopic image (the combination of the two captured images) is kept in memory, in at least one of the devices, casing 1 and smartphone 7 (optionally, the casing 1 can display them, in which case the stereoscopic image is displayed on the screen 3 of the casing).

B/ Tablet mode:

The casing performs the traditional functions of a tablet, the central processing unit of the smartphone 7 managing the tablet, the connection between the two casings allowing this functionality. For example, the smartphone 7 and the casing 1 both operate under Android (registered trademark).

The casing 1 and the smartphone 7 can operate separately, once disengaged.

Files are optionally transferred from the memory of the casing 1 to that of the smartphone 7, mirror memory: unless otherwise instructed and configured, the first and second memories contain the same application data; in other words, the data used are generated by the computer applications and programs.

The screen 3 of the casing 1 serving for the mobile telephone 7, touchscreen to replace the first screen, If there is an incoming call while the smartphone 7 is housed in the housing 6, the number of the caller appears on the small screen of the closed casing or on the screen 3 of the open casing. The casing is provided with a speaker and a microphone to take the call, but at any time, the smartphone can be removed from the casing to continue the conversation with only the smartphone.

C/ Computer mode:

The casing performs the traditional computer functions, comprising at least text processing and Internet browsing, Optionally, the casing 1 does not work with the same operating system as the smartphone 7, dependent on the configurations by the user, the switching of operating systems being done automatically and with the keyboard is exposed, Files are optionally transferred from the memory of the casing to that of the mobile telephone.

Preferably, in the case where the personal digital assistant implements the tablet and computer operating modes, with two different operating systems, the switching between the operating systems done being done automatically during the change of position of the screen 3 of the casing 1.

D/ Mobile telephone mode separated from the casing.

Aside from the stereoscopic photograph and video functions, it is possible, by short-distance communication (for exhibit, Bluetooth or NFC), to continue the operation of the modes described above.

In embodiments, added to these operating modes is an extended mobile telephone mode, in which everything happens as if the user had a smartphone with a larger screen than that of his smartphone and keyboard for faster entry of the characters, the casing being used as a peripheral for display and capture of tactile pressing, and optionally, entering text on the keyboard and image capture:

The screen 3 of the casing duplicates the screen of the mobile telephone and returns data from the touch-sensitive screen to the mobile telephone, The keyboard is optionally used, Files are optionally transferred from the memory of the mobile telephone to that of the casing, and if there is an incoming call while the telephone is fitted in, the number of the caller appears on the small screen of the closed casing or on the screen 3 of the open casing. The casing is provided with a speaker and a microphone to take the call, but at any time the smartphone can be removed from the casing to continue the conversation with only the smartphone.

Figure 20:
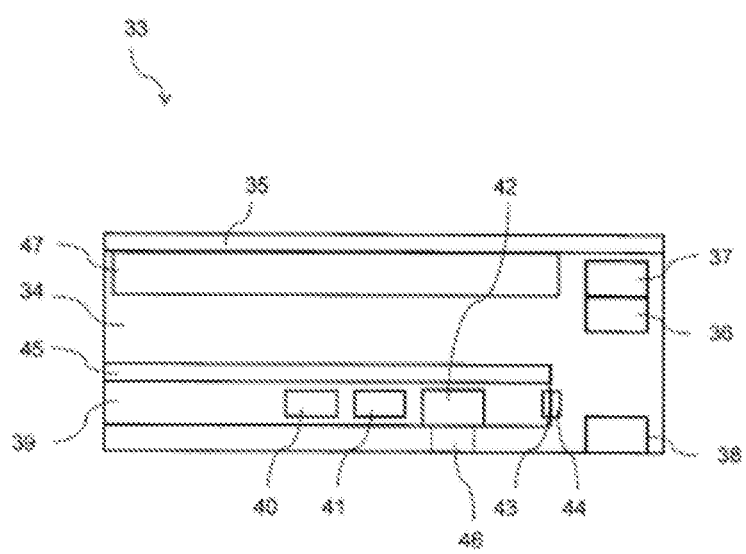
FIG. 20 shows, schematically, electronic components of the casing and the smartphone.

FIG. 20 shows a portable personal digital assistant 33 that includes:

a mobile telephone 39 provided with a first screen 45, a first central processing unit 40 managing a first memory 41, a casing 34 including at least one second screen 35, a second entry processing unit 36 managing a second memory 37.

The casing 34 includes a recess configured to receive and retain, removably, at least part of the mobile telephone 39 inside it.

Communication means allow the exchange of data, in a wired manner, via electrical connectors, or non-wired connectors, through optical connectors or wireless communication connectors, between the central processing units 36 of the casing 34 and 40 of the mobile telephone 39.

At least one of the central processing units 36 and 40 is configured to store data in each of the first and second memories 41 and 37. Preferably, each of the central processing units 36 and 40 is configured to store data in each of the first and second memories.

FIG. 20 also shows a first image sensor 42 of the mobile telephone 39 and a second image sensor 38 of the casing 34. The casing 34 includes an opening 46 across from the recess in the position where the first image sensor 42 is located when the mobile telephone 39 is at least partially inserted and retained in the recess of the casing 34. The optical axes of the image sensors 38 and 40 are parallel and separated by a distance comprised between five and eight centimeters, and preferably between six and seven centimeters. Preferably, the first and/or second screen 35 is auto-stereoscopic.

Communication means 43 and 44, made up of connectors or short-range transceivers, enable the communication between the central processing units of the casing and the mobile telephone. The casing 34 preferably includes a keyboard 47 for a quick entry of alphanumeric characters.

The invention claimed is:

1. A portable personal digital assistant, comprising:
a mobile telephone provided with a first screen, a first central processing unit managing a first memory,
a casing including at least one second screen, a second central processing unit managing a second memory,
the casing including a recess configured to receive and retain, removably, at least part of the mobile telephone inside it,
communication means between the central processing units of the casing and the mobile telephone,
at least one of the central processing units being configured to store data in each of the first and second memories,
wherein the casing includes a keyboard, the second screen being slidingly mounted over said keyboard when it is facing toward the outside of the casing, said second screen being rotated when it either does not cover said keyboard or covers said keyboard while facing toward the inside of the casing.

2. The personal digital assistant according to claim 1, wherein each of the central processing units is configured to store data in each of the first and second memories.

3. The personal digital assistant according to claim 1, wherein the mobile telephone includes a first image sensor and the casing includes an opening across from the recess in the position where the image sensor is located when the mobile telephone is at least partially inserted and retained in the recess of the casing.

4. The personal digital assistant according to claim 3, wherein the casing includes a second image sensor positioned at a distance between five and eight centimeters from said opening.

5. The personal digital assistant according to claim 4, wherein the second screen is of the auto-stereoscopic type.

6. The personal digital assistant according to claim 1, wherein the casing includes, in its housing, at least one connector configured to connect to a connector of the mobile telephone when the mobile telephone is at least partially inserted into said recess.

7. The personal digital assistant according to claim 1, wherein the second screen includes, on two opposite sides, two side studs, a support of the second screen in the casing including, on two opposite sides, two rails for guiding the translation of the studs of the second screen, the support also including two side studs on said sides, and the second screen being surrounded, on said sides, by guide rails for the side studs of the support.

8. The personal digital assistant according to claim 7, wherein each rail of the support has, at one of its ends, a circular opening with a set of electrical contacts in an arc of circle corresponding to electrical contacts located on an edge of the second screen, the electrical contacts of the second screen sliding on the electrical contacts of the support during the incline of the screen.

9. The personal digital assistant according to claim 8, wherein each rail of the support has, at the other of its ends, electrical contacts on which the electrical contacts of the second screen bear when the second screen covers the keyboard while being turned toward the outside of the casing.

10. The personal digital assistant according to claim 1, wherein the casing includes a third screen stored in a slot inside the second screen, the third screen leaving the second screen when it is pulled, then being positioned edge to edge with the second screen.

11. The personal digital assistant according to claim 1, wherein optocouplers are respectively secured to the second screen and a support of the second screen, said optocouplers being located opposite, during a rotational movement of the screen with respect to a screen support.

12. The personal digital assistant according to claim 1, wherein the casing includes a key for taking a call when the mobile telephone is housed in the recess and receives a telephone call.

13. The personal digital assistant according to claim 1, wherein at least one of the central processing units is configured to command joint operation of the casing and the mobile telephone so that, in a photo device or camera operating mode with three-dimensional images:
    both image sensors have the same field of vision, optionally through a digital zoom, and are synchronized;
    the stereoscopic image, done through a combination of two captured images, is kept in memory, in at least one of the first and second memories.

14. The personal digital assistant according to claim 1, wherein at least one of the central processing units is configured to command joint operation of the casing and the mobile telephone so that, in a tablet operating mode, the first central processing unit of the smartphone manages the second screen, the first and second memories containing the same application data, the second screen serving for the mobile telephone, as touchscreen replacing the first screen, which remains off.

15. The personal digital assistant according to claim 1, wherein at least one of the central processing units is configured to command joint operation of the casing and the mobile telephone so that, in a computer operating mode, the casing performs traditional computer functions, including text processing and Internet browsing.

16. The personal digital assistant according to claim 14, wherein the computer operating mode does not implement the same operating system as the tablet operating mode, and switching between the operating systems is done automatically during a change of position of the screen of the casing.

17. The personal digital assistant according to claim 1, wherein at least one of the central processing units is configured to command joint operation of the casing and the mobile telephone so that, in an extended mobile telephone operating mode, in which the second screen is used as a peripheral for display and capturing touch-sensitive pressing and a keyboard is used for entering text.

* * * * *